United States Patent
Shimanaka

(10) Patent No.: US 11,511,809 B2
(45) Date of Patent: Nov. 29, 2022

(54) VEHICLE BODY STRUCTURE

(71) Applicant: Mazda Motor Corporation, Hiroshima (JP)

(72) Inventor: Tsuneki Shimanaka, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/356,537

(22) Filed: Jun. 24, 2021

(65) Prior Publication Data
US 2022/0001931 A1    Jan. 6, 2022

(30) Foreign Application Priority Data

Jul. 1, 2020    (JP) .............................. JP2020-113839

(51) Int. Cl.
| | | |
|---|---|---|
| B62D 25/02 | (2006.01) | |
| B62D 29/00 | (2006.01) | |
| B62D 25/04 | (2006.01) | |
| B62D 25/06 | (2006.01) | |

(52) U.S. Cl.
CPC ........... *B62D 25/02* (2013.01); *B62D 25/025* (2013.01); *B62D 25/04* (2013.01); *B62D 25/06* (2013.01); *B62D 29/005* (2013.01)

(58) Field of Classification Search
CPC ...... B62D 25/025; B62D 25/02; B62D 25/04; B62D 25/06; B62D 29/005; B62D 27/026
USPC ...... 296/187.01, 187.09, 187.1, 209, 193.06, 296/901.01, 210
See application file for complete search history.

(56) References Cited

U.S. PATENT DOCUMENTS 9,815,498 B2 *  11/2017  Yamamoto ........... B62D 29/002

FOREIGN PATENT DOCUMENTS

| JP | 9-99856 A | 4/1997 | |
|---|---|---|---|
| JP | 4709174 B2 * | 6/2011 | ............ B21J 15/025 |

* cited by examiner

*Primary Examiner* — Dennis H Redder
(74) *Attorney, Agent, or Firm* — Xsensus LLP

(57) ABSTRACT

A vehicle body structure includes: a first frame that is formed of a first material and has a closed cross section; and a second frame that is formed of a second material and has a closed cross section. The first frame and the second frame are aligned with each other in a vehicle longitudinal direction. The second frame has higher tensile strength and is lighter than the first frame. In a front cross-sectional view of the vehicle, a second center associated with the second frame is located on an outer side in a vehicle width direction from a first center associated with the first frame with respect to vehicle center.

17 Claims, 12 Drawing Sheets

VEHICLE BODY STRUCTURE

CROSS REFERENCE TO RELATED APPLICATION

The present application claims priority to Japanese App. No. 2020-113839 filed Jul. 1, 2020, the entire content and disclosure of which is incorporated by reference herein in its entirety.

TECHNICAL FIELD

The present disclosure relates to a vehicle body structure of a vehicle.

BACKGROUND ART

Conventionally, a vehicle body structure, for which a pillar frame formed of an aluminum extruded material is adopted to improve durability and reduce weight of a vehicle body, in which the pillar frame has plural closed cross sections.

More specifically, in a pillar structure disclosed in patent document 1, a front pillar section and a side edge section of a roof are formed of the pillar frame that is formed by extruding an aluminum material. The pillar frame has a cross-sectional shape in which a large cylindrical section and a small cylindrical section facing outward are continuously provided and integrated as two closed cross sections located on the inside of the vehicle body.

PRIOR ART DOCUMENTS

Patent Documents

[Patent document 1] JP-A-9-99856

SUMMARY

According to one or more aspects, a vehicle body structure of a vehicle is disclosed or provided. The vehicle body structure can comprise: a first frame that is formed of a first material and has a first closed cross section; and a second frame that is formed of a second material, different from the first material, and has a second closed cross section. The first frame and the second frame can be aligned with each other in a vehicle longitudinal direction, the second frame can have higher tensile strength and is lighter than the first frame, and in a front cross-sectional view of the vehicle, a center associated with the second frame can be located on an outer side in a vehicle width direction from a center associated with the first frame with respect to a vehicle center.

DETAILED DESCRIPTION

Figure 1:
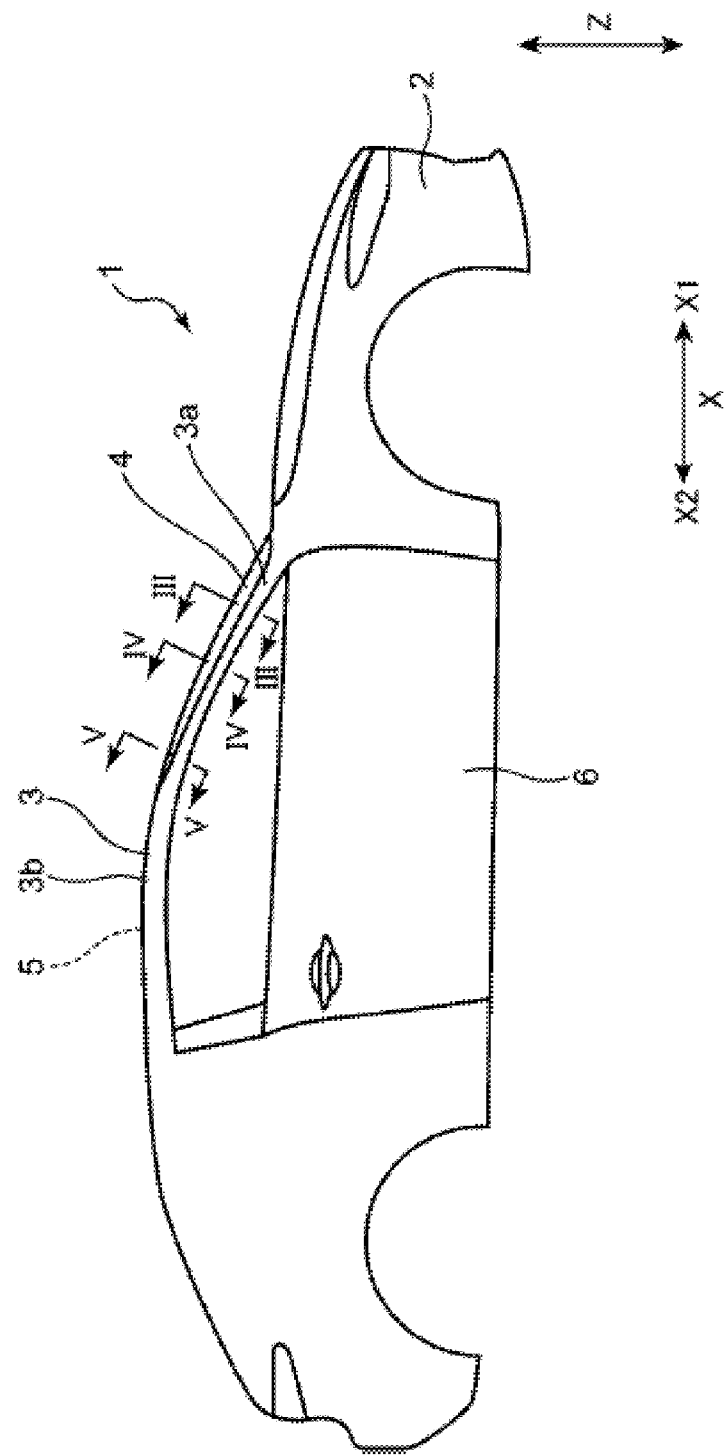
FIG. 1 is a side view illustrating an overall configuration of a vehicle having a vehicle body structure according to one or more embodiments of the present disclosure.

A detailed description will hereinafter be made on a preferred embodiment of the present disclosure with reference to the accompanying drawings.

In the above vehicle body structure of the Background Art section, the pillar frame that is formed of the aluminum material and has the plural closed cross sections is used for the vehicle body. However, as a characteristic of the aluminum material, tensile strength thereof against pulling, twisting, and the like can be less than that of a material such as steel. Thus, it is concerned that sufficient steering stability of a vehicle cannot be achieved.

Thus, in order to improve the tensile strength of the vehicle body, it is considered to increase an amount of the aluminum material and enlarging a cross-sectional shape of the pillar frame. However, in these cases, weight reduction of the vehicle body may be inhibited, and improvement in freedom of design of the vehicle body may become difficult due to an increase in an external dimension of the pillar frame.

Embodiments of the present disclosure have been made in view of the above circumstance and other circumstances, and, therefore, can have a purpose, of multiple purposes, of providing a vehicle body structure capable of reducing weight of a vehicle body, improving steering stability, and/or improving freedom of design of the vehicle body.

In order to solve the above problem and other problems, a vehicle body structure according to embodiments of the present disclosure can involve a vehicle body structure of a vehicle that can include: a first frame that is formed of a first material and has a closed cross section; a second frame that is formed of a second material and has a closed cross section. The first frame and the second frame can be aligned with each other in a vehicle longitudinal direction. The second frame can have higher tensile strength and be lighter than the first frame. In a front cross-sectional view of the vehicle, a center of a drawing of the second frame can be located on an outer side in a vehicle width direction from a center of a drawing of the first frame with respect to vehicle center.

With such a configuration, in the vehicle body structure including the first frame and the second frame, which have the closed cross sections, the second frame can have the higher tensile strength and be lighter than the first frame. In the front cross-sectional view of the vehicle, the center of the drawing of the second frame can be located on the outer side in the vehicle width direction from the center of the drawing of the first frame with respect to the vehicle center. In this way, modification of the vehicle body can be suppressed while moment of inertia with respect to the vehicle center can be reduced during travel of the vehicle. Thus, it can be possible to simultaneously reduce weight of the vehicle body and improve steering stability of the vehicle. In addition, a composite frame formed of the first frame and the second frame, which can be lighter and have the higher tensile strength than the first frame, can be adopted. Accordingly, compared to a case where a frame having the plural closed cross sections is formed of only the first material constituting the first frame, it can be possible to suppress an increase in an external dimension while securing the tensile strength. Therefore, it can be possible to improve freedom of design of the vehicle body.

In the vehicle body structure, the first frame can have a polygonal shape having plural sides in the front cross-sectional view of the vehicle, the plural sides can have the at least two outer sides with which a surface constituting an outer circumferential surface of the first frame faces an outer side in the vehicle width direction, and the second frame can include two fixed surfaces that can be fixed to the at least two outer sides.

With such a configuration, it can be possible to efficiently transmit a torsional load and/or a bending load, which may be applied to the first frame during travel of the vehicle, from the at least two outer sides, with which the surface constituting the outer circumferential surface of the first frame faces the outer side in the vehicle width direction of the first frame, to the second frame with the high tensile strength via the at least two fixed surfaces, which can respectively be fixed to the outer sides, in the second frame, that is, by plural transmission paths. As a result, it can be possible to further improve the steering stability of the vehicle.

In the above vehicle body structure, the at least two fixed surfaces can adhere to the at least two outer sides.

With such a configuration, the at least two fixed surfaces of the second frame can adhere to the at least two outer sides of the first frame. In this way, the two different adhesive surfaces can be formed. Accordingly, in the case where the torsional load and/or the bending load may be applied to the first frame, it can be possible to reliably transmit the load from the first frame to the second frame while at least one of the two adhesive surfaces is applied with a shearing load. As a result, it can be possible to further improve the steering stability of the vehicle.

In the vehicle body structure, the first frame can have a rhomboid shape having four sides including the two outer sides in the front cross-sectional view of the vehicle, and the second frame can include the two fixed surfaces that can be fixed to the two outer sides of the first frame.

With such a configuration, the first frame can have the rhomboid cross-sectional shape having the four sides. Thus, the first frame can have a small cross-sectional dimension even with the two outer sides. As a result, the freedom of the design of the vehicle body can be further improved. In addition, it can be possible to efficiently transmit the torsional load and/or the bending load, which may be applied to the first frame during the travel of the vehicle, from the two outer sides of the first frame to the second frame with the high tensile strength via the two fixed surfaces of the second frame by the two transmission paths. As a result, it can be possible to simultaneously achieve further improvement in the freedom of the design of the vehicle body and further improvement in the steering stability of the vehicle.

In the above vehicle body structure, the first frame can be arranged such that, of plural diagonal lines in the cross section of the polygonal shape, the longest diagonal line faces the vehicle vertical direction.

With such a configuration, cross-sectional secondary moment in the vertical direction of the first frame can be the highest. Thus, it can be possible to maximize bending strength of the first frame against the bending load in the vertical direction. Accordingly, it can be possible to improve the bending strength in the vertical direction without increasing the external dimension of the first frame and thus to further improve the freedom of the design of the vehicle body.

According to the vehicle body structure in embodiments of the present disclosure, it can be possible to reduce the weight of the vehicle body, improve the steering stability, and/or improve the freedom of the design of the vehicle body.

Figure 2:
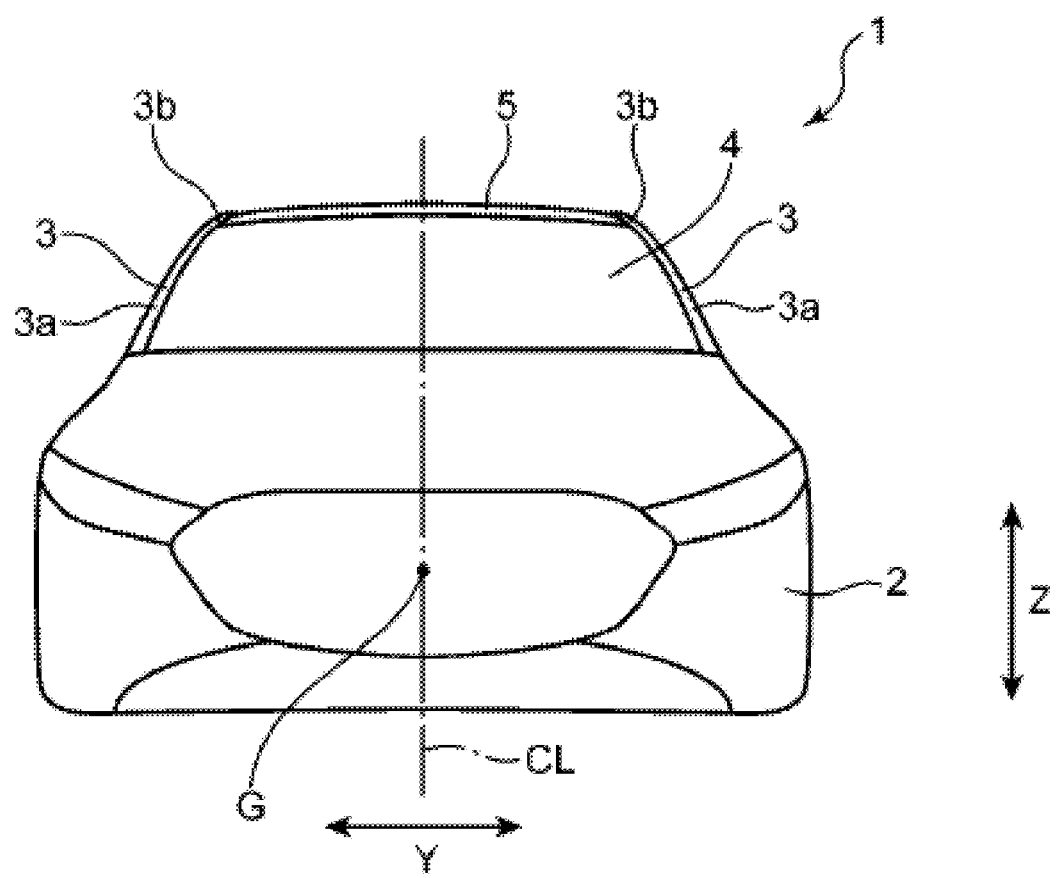
FIG. 2 is a front view of the vehicle in FIG. 1.

A vehicle body structure illustrated in FIGS. 1 to 2 is a vehicle body structure of a vehicle 1 such as an automobile, and can include: a pair of roof rails 3 constituting an upper portion of a vehicle body 2; a front windshield 4; a roof panel 5; and a pair of doors 6 attached to both sides of the vehicle body 2 in a vehicle width direction Y.

Each of the paired roof rails 3 can have: a roof rail body section 3b that extends in a vehicle longitudinal direction X; and a pillar section 3a that extends downward and to vehicle front X1 in the vehicle 1 from a front end of the roof rail body section 3b.

The front windshield 4 can be provided to cover a portion between the pillar sections 3a of the paired roof rails 3. Each lateral end of the front windshield 4 can extend upward and to vehicle rear X2 along the pillar section 3a.

The roof panel 5 can cover a portion between the roof rail body sections 3b of the paired roof rails 3 and can constitute a ceiling of the vehicle body 2. Each lateral end of the roof panel 5 can extend to the vehicle rear X2 along the roof rail body sections 3b.

Each of the paired roof rails 3 can be constructed of a composite frame that is formed from plural types of materials. More specifically, as illustrated in FIGS. 3 to 7, each of the paired roof rails 3 can be constructed of a first frame 11 and a second frame 12. The first frame 11 and the second frame 12 can be aligned in the vehicle width direction Y and a vertical direction Z and can extend in the vehicle longitudinal direction X.

The first frame 11 can be a long or elongate body (e.g., elongate cylinder or elongate cube) that is formed of a first material, can have a closed cross section 11a, and can extend in the longitudinal direction X of the vehicle 1. The first frame 11 may be hollow.

For example, the first frame 11 can be manufactured by using, as the first material, a metal material, such as aluminum or steel, that is rigid and can be manufactured inexpensively.

The first frame 11 illustrated in FIGS. 3 to 6 can have a polygonal shape having plural sides 11b, 11c, 11d, 11e in front cross-sectional view of the vehicle 1, and can have a rhomboid shape in this embodiment. In other words, these sides 11b, 11c, 11d, 11e can constitute the closed cross section 11a in the rhomboid shape (the polygonal shape).

The plural sides 11b, 11c, 11d, 11e can have a first outer side 11b and a second outer side 11c as at least two outer sides with which a surface constituting an outer circumferential surface of the first frame 11 can face an outer side Y1 in the vehicle width direction. The first outer side 11b can face the outer side Y1 in the vehicle width direction of the first frame 11 and obliquely upward. The second outer side 11c can face the outer side Y1 in the vehicle width direction of the first frame 11 and obliquely downward.

Meanwhile, the second frame 12 can include at least two fixed surfaces 12b1, 12b2, which will be described below, as surfaces that can be fixed to the at least two outer sides 11b, 11c, respectively.

Accordingly, the first frame 11 can have the at least two outer sides 11b, 11c, each of which can face outward in the vehicle width direction Y. Thus, compared to a case where only one outer side is provided (for example, only the outer side 11b of the first frame 11 having a rectangular cross section faces the outer side Y1 in the vehicle width direction), it can be possible to secure a large area for fixing to the second frame 12 by adhesion or the like.

As illustrated in FIGS. 3 to 5 and FIG. 7, the second frame 12 can be a long or elongate body that is formed of a second material, can have a closed cross section 12a, and can extend in the longitudinal direction X of the vehicle 1.

For example, the second frame 12 can be manufactured by using, as the second material, a reinforced fiber resin, such as CFRP, that is reinforced by carbon fiber. Compared to the metal material, such as aluminum or steel, that is adopted as the above first material, the reinforced fiber resin such as the CFRP can have properties of being lightweight (that is, weight per unit weight (or specific weight) is light) and high tensile strength (further more specifically, rigidity such as torsional rigidity or bending rigidity is high).

The second frame 12 can have the long or elongate shape having the closed cross section 12a when being cut in the vehicle width direction Y of the vehicle 1. The closed cross section 12a can be formed of a first frame fixed section 12b, an outer surface constituting section 12c, and a weather strip attachment section 12d. Each of these first frame fixed section 12b, outer surface constituting section 12c, and weather strip attachment section 12d can be manufactured by using a fiber-reinforced resin material, for instance, in a flat plate shape formed from the CFRP and the like. Each of the fiber-reinforced resin material in the thin plate shape can be oriented such that the reinforced fiber such as the carbon fiber extends in a longitudinal direction (primarily, the vehicle longitudinal direction X) of the second frame 12. The second frame 12 having the closed cross section 12a can be manufactured by joining the first frame fixed section 12b, the outer surface constituting section 12c, and the weather strip attachment section 12d at the time of sintering of the carbon fiber, for instance. Due to a structure having the closed cross section 12a that is formed of such a fiber-reinforced resin material, the second frame 12 can have higher tensile strength and can be lighter (that is, weight per unit weight (or specific weight) is lighter) than the first frame 11.

The first frame fixed section 12b can include a first fixed surface 12b1 and a second fixed surface 12b2 as two fixed surfaces that can be fixed to the two outer sides 11b, 11c of the first frame 11, respectively. That is, the fixed surface 12b1 can be fixed to the outer side 11b, and the fixed surface 12b2 can be fixed to the outer side 11c.

Figure 3:
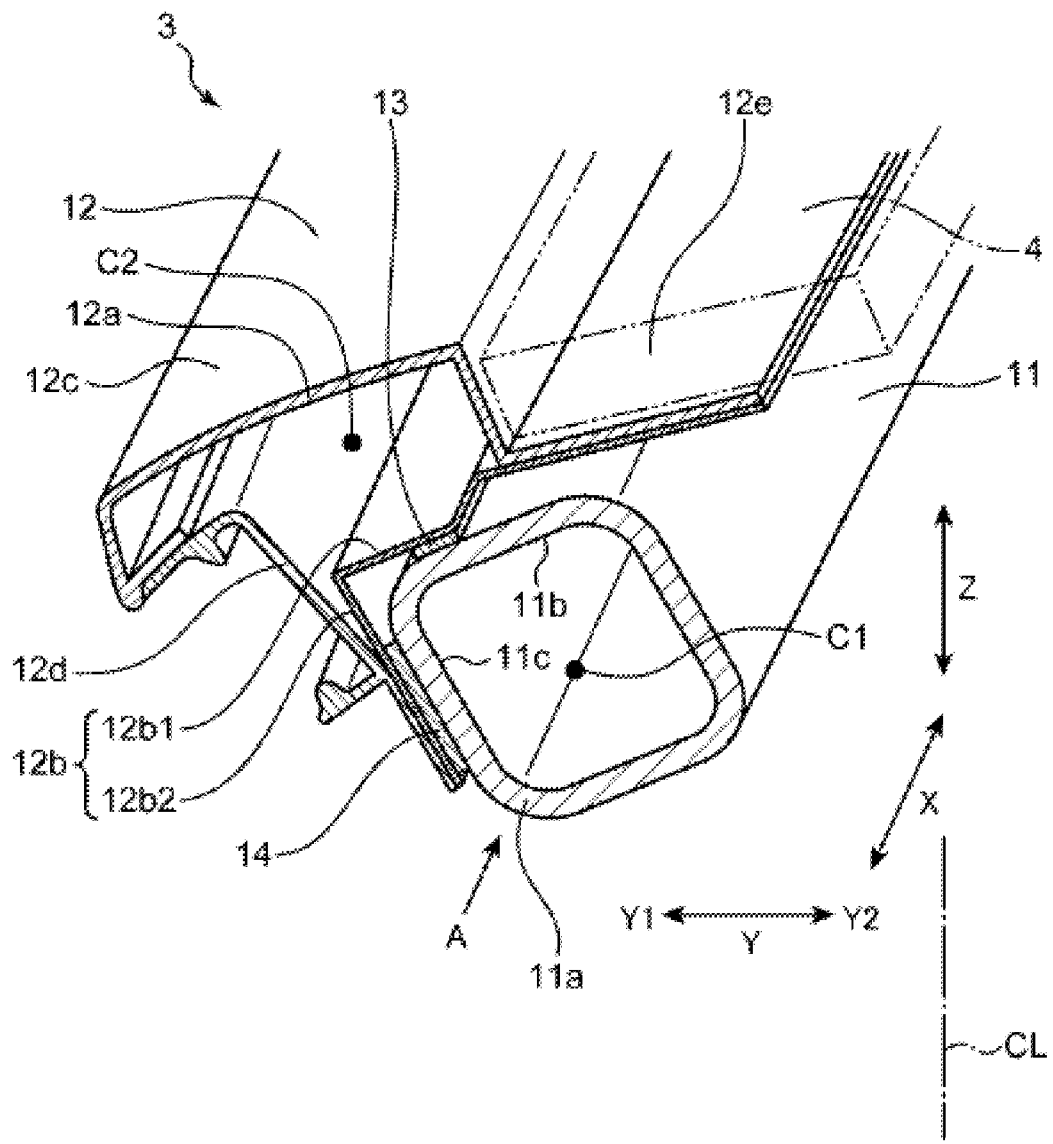
FIG. 3 is a cross-sectional view that is taken along line III-III in FIG. 1.
Figure 4:
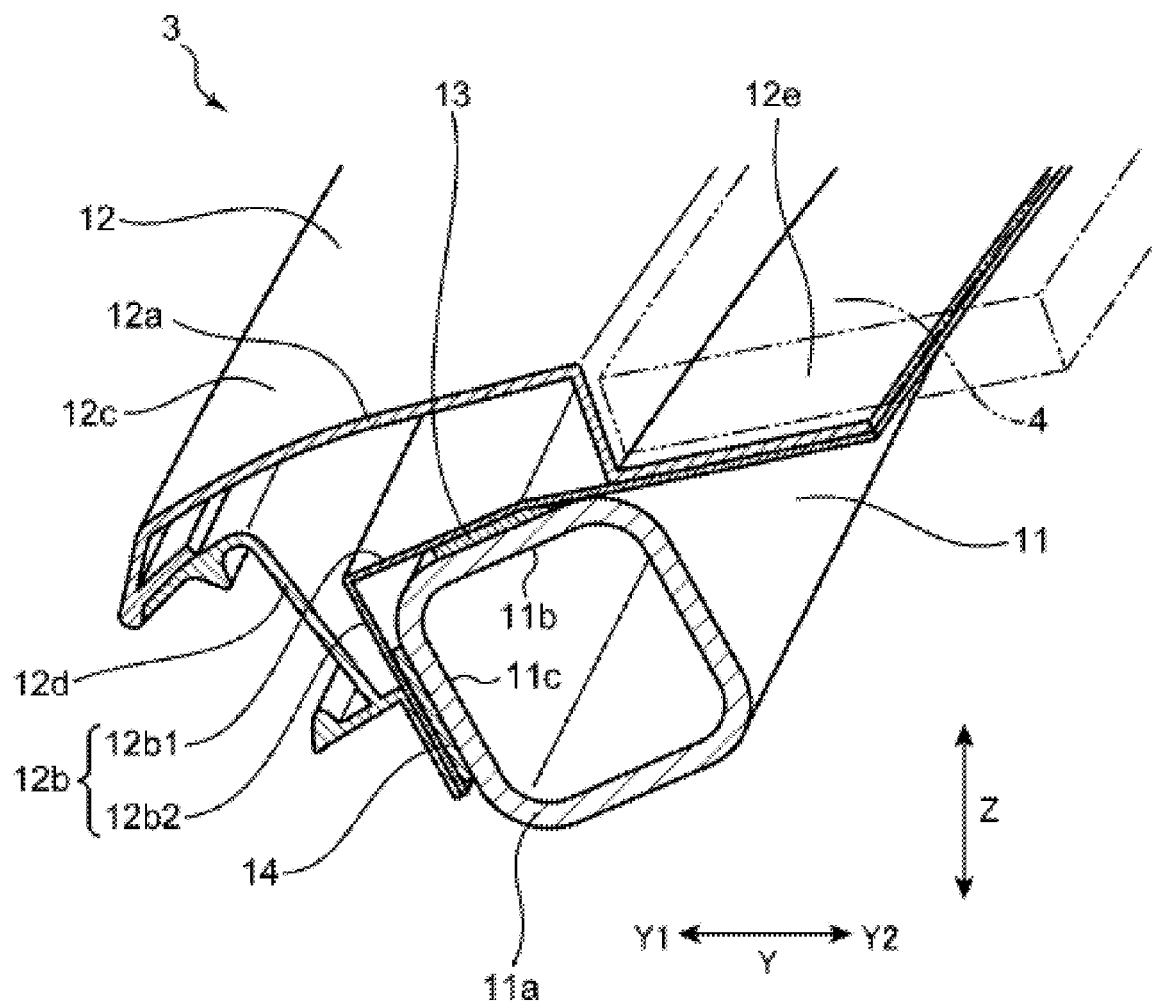
FIG. 4 is a cross-sectional view that is taken along line IV-IV in FIG. 1.
Figure 5:
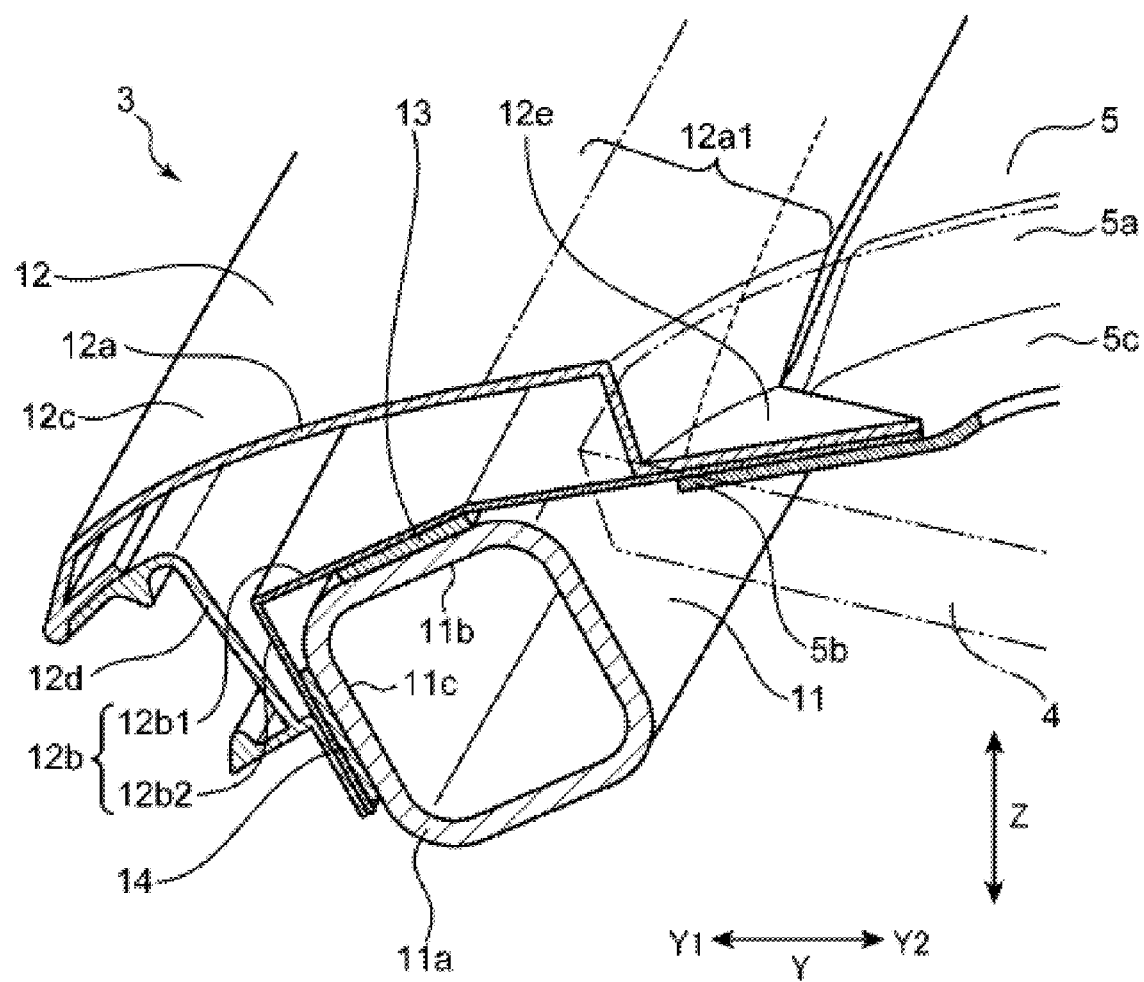
FIG. 5 is a cross-sectional view that is taken along line V-V in FIG. 1.
Figure 6:
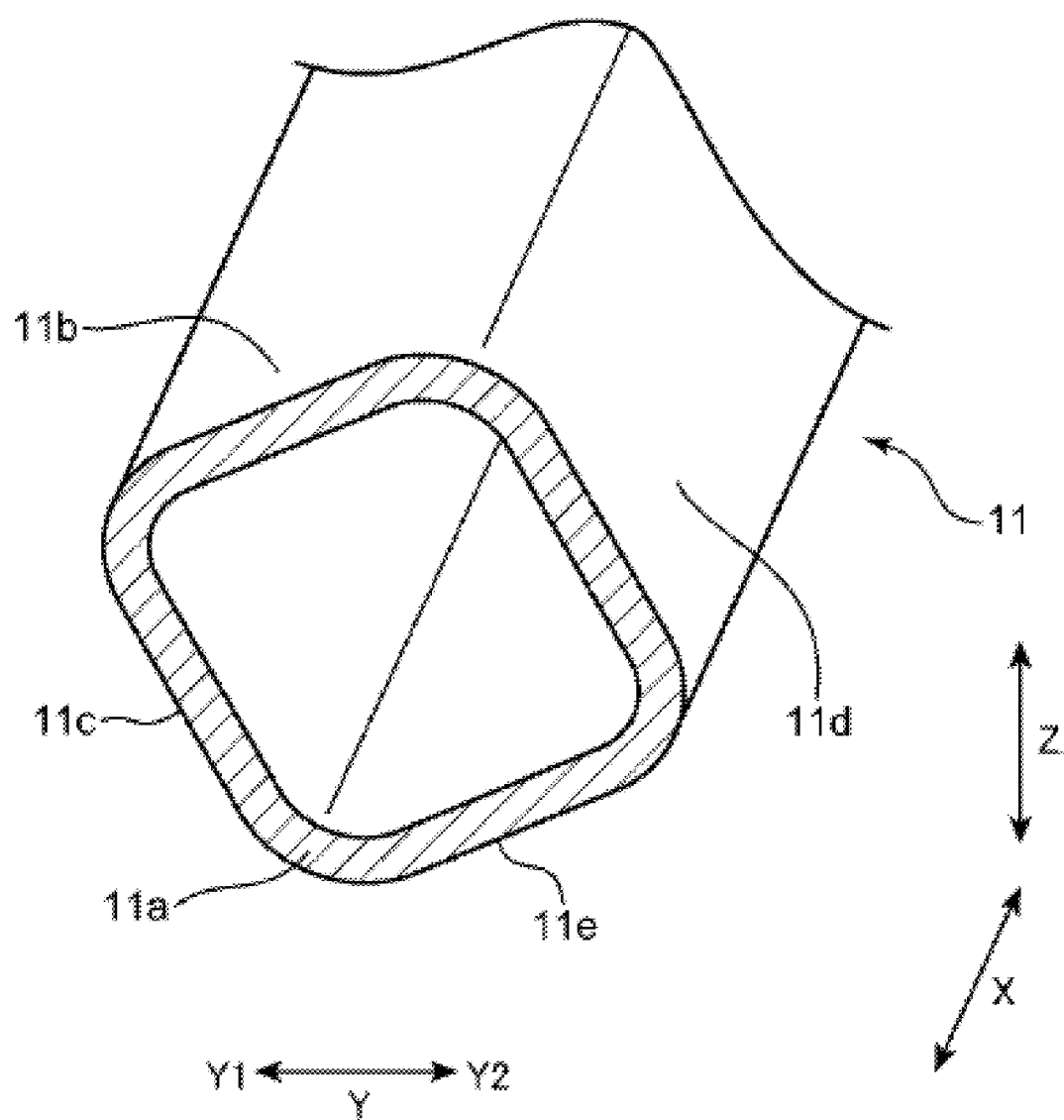
FIG. 6 is an enlarged perspective view of a first frame in FIG. 3.
Figure 7:
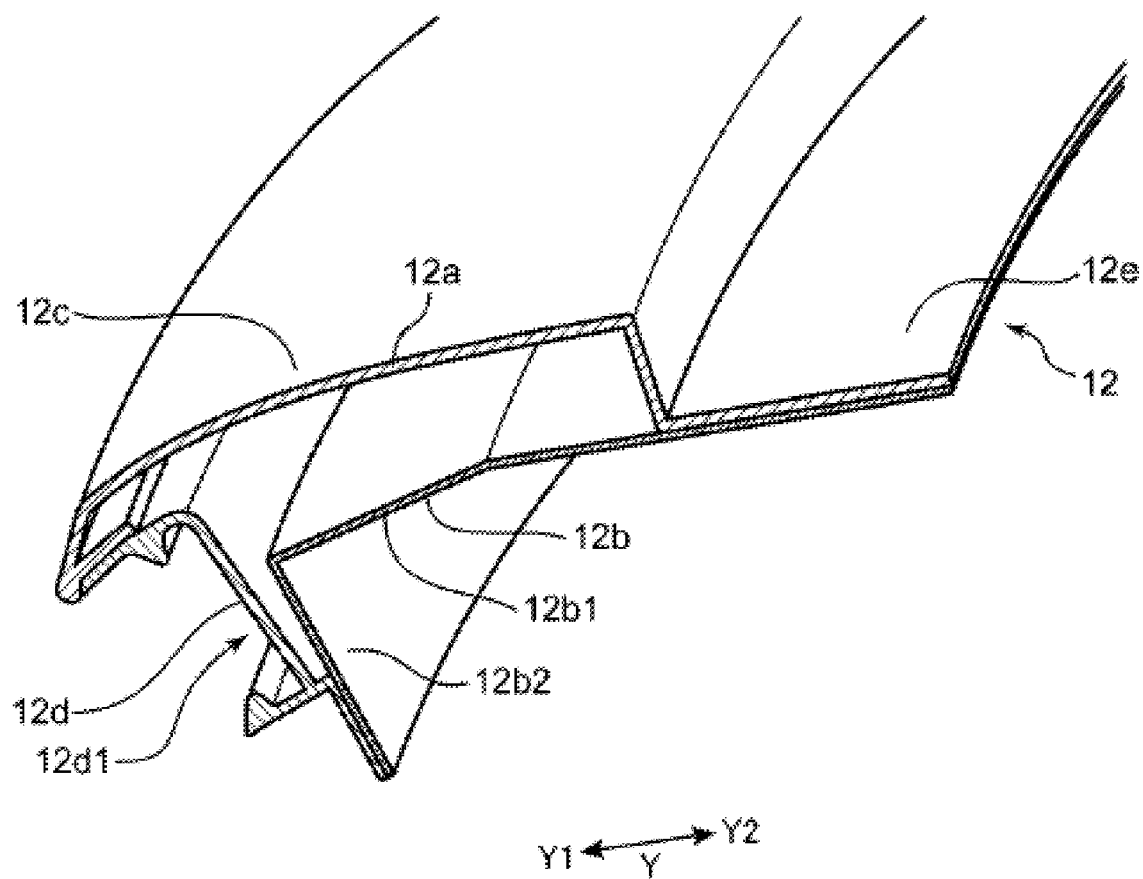
FIG. 7 is an enlarged perspective view of a second frame in FIG. 3.

The first fixed surface 12b1 and the second fixed surface 12b2 can face different directions and can be orthogonal to each other in this embodiment illustrated in FIGS. 3 to 5.

In this embodiment, as illustrated in FIGS. 3 to 5, the at least two fixed surfaces 12b1, 12b2 of the second frame 12 can respectively adhere to the at least two outer sides 11b, 11c of the first frame 11.

More specifically, the first fixed surface 12b1 can oppose the first outer side 11b, which can face the outer side Y1 in the vehicle width direction of the first frame 11 and obliquely upward, and can be adhered to the first outer side 11b by an adhesive 13.

The second fixed surface 12b2 can oppose the second outer side 11c, which can face the outer side Y1 in the vehicle width direction of the first frame 11 and obliquely downward, and can be adhered to the second outer side 11c by an adhesive 14.

In this embodiment, the adhesives 13, 14 can be separated, but alternatively may be connected.

The outer surface constituting section 12c can be a portion that can be seen from the outside of the vehicle 1, and can constitute a part of a design surface of the vehicle 1.

The weather strip attachment section 12d can have a fitting concave section 12d1 (see FIG. 7) that can face and be opened to the outer side Y1 in the vehicle width direction of the vehicle 1. The fitting concave section 12d1 can be a groove that extends in the vehicle longitudinal direction X, and a weather strip that is formed of a long resin material can be attached thereto.

In this embodiment, the weather strip attachment section 12d can be integrally formed in the second frame 12, which can prevent a bulge, a seam, or the like that may be otherwise formed at the time when another member is attached. As a result, design quality of the vehicle 1 can be improved.

The weather strip may be fixed to the fitting concave section 12d1 by a method other than adhesion such as riveting or by both of adhesion and riveting.

As illustrated in FIGS. 3 to 5, the second frame 12 can further have a flange section 12e that is formed by projecting the first frame fixed section 12b and the outer surface constituting section 12c, which can constitute the closed cross section 12a, to an inner side Y2 in the vehicle width direction Y. In a portion on the vehicle front side X1 of the second frame 12, the flange section 12e can extend in the longitudinal direction (e.g., primarily the vehicle longitudinal direction X) of the second frame 12. End portions on both sides of the front windshield 4 can be fixed to the flange section 12e by adhesion or the like.

As illustrated in FIG. 5, in a portion that extends in parallel with the roof panel 5 in the second frame 12, the first frame fixed section 12b and the outer surface constituting section 12c, which can constitute the closed cross section 12a of the second frame 12, can be projected to the inner side Y2 in the vehicle width direction Y from the first upper outer side 11b of the first frame 11, and an inner extending section 12a1 of the closed cross section 12a can be thereby formed. Meanwhile, a flange section 5b that can be projected to the outer side Y1 in the vehicle width direction Y can be formed on each side in the vehicle width direction Y of the roof panel 5. The flange section 5b can adhere to a lower surface of the inner extending section 12a1 of the closed cross section 12a. In this way, end portions on both of the sides of the roof panel 5 can be fixed to the paired roof rails 3.

Here, as illustrated in FIG. 5, an upper end portion of the front windshield 4 can be adhered (directly or indirectly) to an upper surface of the flange section 12e of the second frame 12 and can be adhered (directly or indirectly to a flange section 5c that can be projected to the front of a body section 5a of the roof panel 5. A front end portion of the flange section 5b of the roof panel 5 can be adhered (directly or indirectly) to a lower surface of the flange section 12e of the second frame 12.

When the arrangement of the second frame 12, which can be configured as described so far, is observed, as illustrated in FIG. 3, in the front cross-sectional view of the vehicle 1, a center C2 (e.g., as shown in the drawing) of the second frame 12 can be located on the outer side Y1 in the vehicle width direction from a center C1 (e.g., as shown the drawing) of the first frame 11 with respect to a vehicle center CL (that is, a center line of the vehicle 1 in the vehicle width direction Y illustrated in FIG. 2).

Here, the "front cross-sectional view" can mean cross-sectional view in which cross sections of the first frame 11 and the second frame 12 in extending directions thereof are seen from the front of the vehicle. The center C1 (e.g., as shown in the drawing) can mean center (center of gravity) of the cross section in the vehicle width direction of the first frame 11. The center C2 (e.g., as shown in the drawing) can mean center (center of gravity) of the cross section in the vehicle width direction of the second frame 12.

As illustrated in FIG. 2, a position of the vehicle center CL in the vehicle width direction Y can be located at center of the vehicle 1 when seen from the front of the vehicle, and can be the same as a center of gravity G of the vehicle 1.

The center C2 of the drawing of the second frame 12 in this embodiment can be located on an upper side of the center C1 of the drawing of the first frame 11 in the vertical direction Z, but alternatively may be located at the same height as or below the center C1 of the drawing of the first frame 11.

(Exemplary Characteristics)

(1)

As illustrated in FIGS. 3 to 5, the vehicle body structure in this embodiment is the vehicle body structure of the vehicle 1 and can include: the first frame 11 that can be formed of the first material such as aluminum or steel and that can have the closed cross section 11a; and the second frame 12 that can be formed of the second material such as the CFRP that can differ from the first material and can have the closed cross section 12a. The first frame 11 and the second frame 12 can be aligned in the vehicle width direction Y and the vertical direction Z and extend in the vehicle longitudinal direction X. The second frame 12 can have a higher tensile strength and be lighter than the first frame 11. As illustrated in FIG. 3, in the front cross-sectional view of the vehicle 1, the center C2 of the drawing of the second frame 12 can be located on the outer side Y1 in the vehicle width direction from the center C1 of the drawing of the first frame 11 with respect to the vehicle center CL.

With such a configuration, in the vehicle body structure including the first frame 11 and the second frame 12, which can be formed of the different materials and can have the closed cross sections 11a, 12a, the second frame 12 can have the higher tensile strength and be lighter than the first frame 11. In the front cross-sectional view of the vehicle, the center C2 of the drawing of the second frame 12 can be located on the outer side Y1 in the vehicle width direction from the center C1 of the drawing of the first frame 11 with respect to the vehicle center CL (the center line of the vehicle 1 in the vehicle width direction Y in FIG. 2). In this way, modification of the vehicle body can be suppressed while moment of inertia with respect to the vehicle center CL can be reduced during travel of the vehicle 1. Thus, it can be possible to simultaneously reduce weight of the vehicle body and improve steering stability of the vehicle 1. In addition, the composite frame formed of the first frame 11 and the second frame 12, which can be lighter and can have the higher tensile strength than the first frame 11, can be adopted. Accordingly, compared to a case where a frame having the plural closed cross sections is formed of only the first material constituting the first frame 11, it can be possible to suppress an increase in an external dimension while securing the tensile strength. Therefore, it can be possible to improve the freedom of the design of the vehicle body.

In other words, in the vehicle body structure in this embodiment, it can be possible to reduce the moment of inertia of the vehicle body with respect to the vehicle center CL by arranging the second frame 12, which can be the lighter member, away from the vehicle center CL. In addition, since the second frame 12 can be located away from the vehicle center CL, cross-sectional secondary moment of the second frame 12 with respect to the vehicle center CL can be increased, and the tensile strength of the second frame 12 can be high. Thus, it can be possible to suppress torsional deformation of the vehicle body and improve the steering stability.

(2)

In the vehicle body structure in this embodiment, as illustrated in FIGS. 3 to 5, the first frame 11 can have the polygonal shape (e.g., the rhomboid shape in this embodiment) having the plural sides 11b, 11c, 11d, 11e in the front cross-sectional view of the vehicle 1. The plural sides 11b, 11c, 11d, 11e can have the at least two outer sides 11b, 11c with which the surface constituting the outer circumferential surface of the first frame 11 can face the outer side Y1 in the vehicle width direction. The second frame 12 can include the at least two fixed surfaces 12b1, 12b2 that can be fixed to the at least two outer sides 11b, 11c, respectively. That is, the fixed surface 12b1 can be fixed to the outer side 11b, and the fixed surface 12b2 can be fixed to the outer side 11c.

With such a configuration, it can be possible to efficiently transmit a torsional load or a bending load, which may be applied to the first frame 11 during the travel of the vehicle 1, from the at least two outer sides 11b, 11c, with which the surface constituting the outer circumferential surface of the first frame 11 can face the outer side in the vehicle width direction Y of the first frame 11, to the second frame 12 with the high tensile strength via the at least two fixed surfaces 12b1, 12b2, which can respectively be fixed to the outer sides 11b, 11c, in the second frame 12, that is, by plural transmission paths. As a result, it can be possible to further improve the steering stability of the vehicle 1.

(3)

In the vehicle body structure in this embodiment, as illustrated in FIGS. 3 to 5, the at least two fixed surfaces 12b1, 12b2 respectively can be adhered (directly or indirectly) to the at least two outer sides 11b, 11c.

With such a configuration, the at least two fixed surfaces 12b1, 12b2 of the second frame 12 can be separately adhere to the at least two outer sides 11b, 11c of the first frame 11. In this way, the two different adhesive surfaces can be formed. Accordingly, in the case where the torsional load or the bending load is applied to the first frame 11, it can be possible to reliably transmit the load from the first frame 11 to the second frame 12 while at least one of the two adhesive surfaces is applied with a shearing load. As a result, it can be possible to further improve the steering stability of the vehicle 1.

(4)

In the vehicle body structure in this embodiment, as illustrated in FIGS. 3 to 5, the first frame 11 can have the rhomboid shape having the four sides 11b, 11c, 11d, 11e including the two outer sides 11b, 11c in the front cross-sectional view of the vehicle 1.

The second frame 12 can include the two fixed surfaces 12b1, 12b2 that can be fixed to the two outer sides 11b, 11c of the first frame 11, respectively.

With such a configuration, the first frame 11 can have the rhomboid cross-sectional shape having the four sides 11b, 11c, 11d, 11e. Thus, the first frame 11 can have the small cross-sectional dimension even with the two outer sides 11b, 11c. As a result, the freedom of the design of the vehicle body can be further improved. In addition, it can be possible to efficiently transmit the torsional load and/or the bending load, which may be applied to the first frame 11 during the travel of the vehicle 1, from the two outer sides 11b, 11c of the first frame 11 to the second frame 12 with the high tensile strength via the two fixed surfaces 12b1, 12b2 of the second frame 12 by the two transmission paths. As a result, it can be possible to simultaneously achieve further improvement in the freedom of the design of the vehicle body and further improvement in the steering stability of the vehicle 1.

(5)

Figure 8:
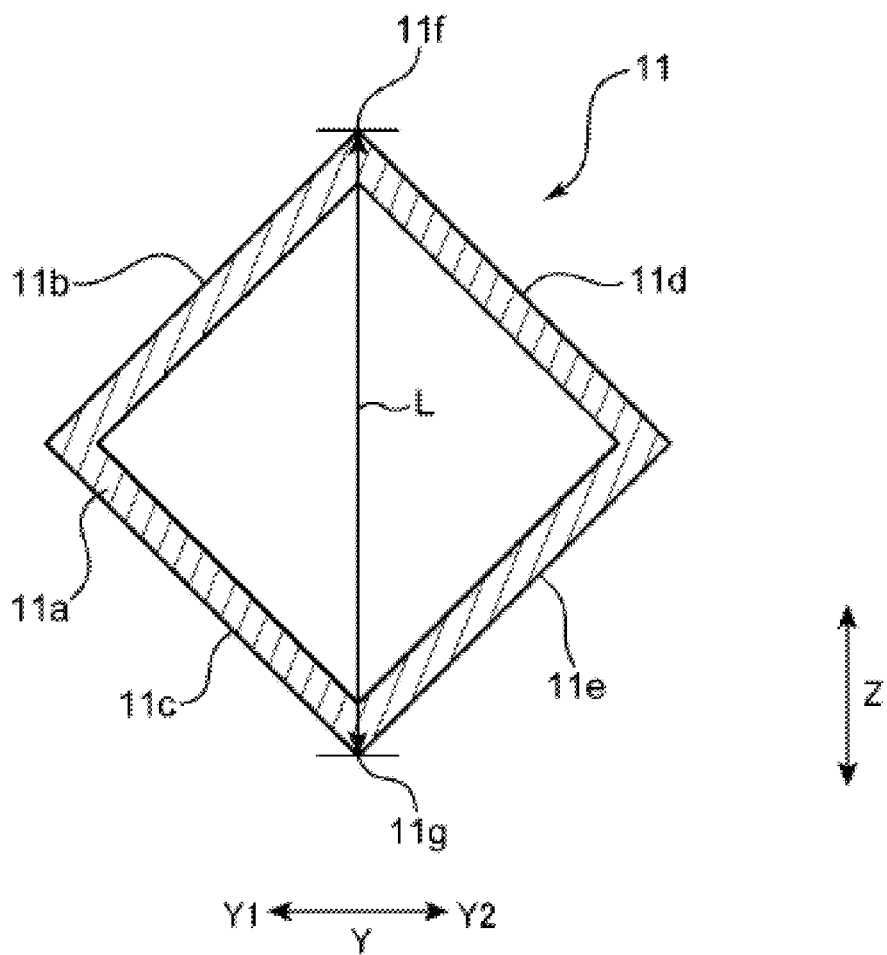
FIG. 8 is a cross-sectional explanatory view schematically illustrating a case where the first frame in FIG. 6 has a rhomboid cross section.

In the vehicle body structure in this embodiment, as illustrated in FIG. 8, the first frame 11 can be arranged such that, of plural diagonal lines in the cross section of the polygonal shape (that is, the closed cross section 11a), a longest diagonal line L can face the vehicle vertical direction Z.

With such a configuration, the cross-sectional secondary moment in the vertical direction Z of the first frame 11 can be the highest. Thus, it can be possible to maximize bending strength of the first frame 11 against the bending load in the vertical direction Z. Accordingly, it can be possible to improve the bending strength in the vertical direction Z without increasing the external dimension of the first frame 11 and thus to further improve the freedom of the design of the vehicle body.

(6)

Here, a magnitude of stress that is applied to the four sides 11b, 11c, 11d, 11e, which constitute the closed cross section 11a of the first frame 11, at the time when the torsional load and the bending load are applied to the first frame 11 in this embodiment can be considered.

Figure 9:
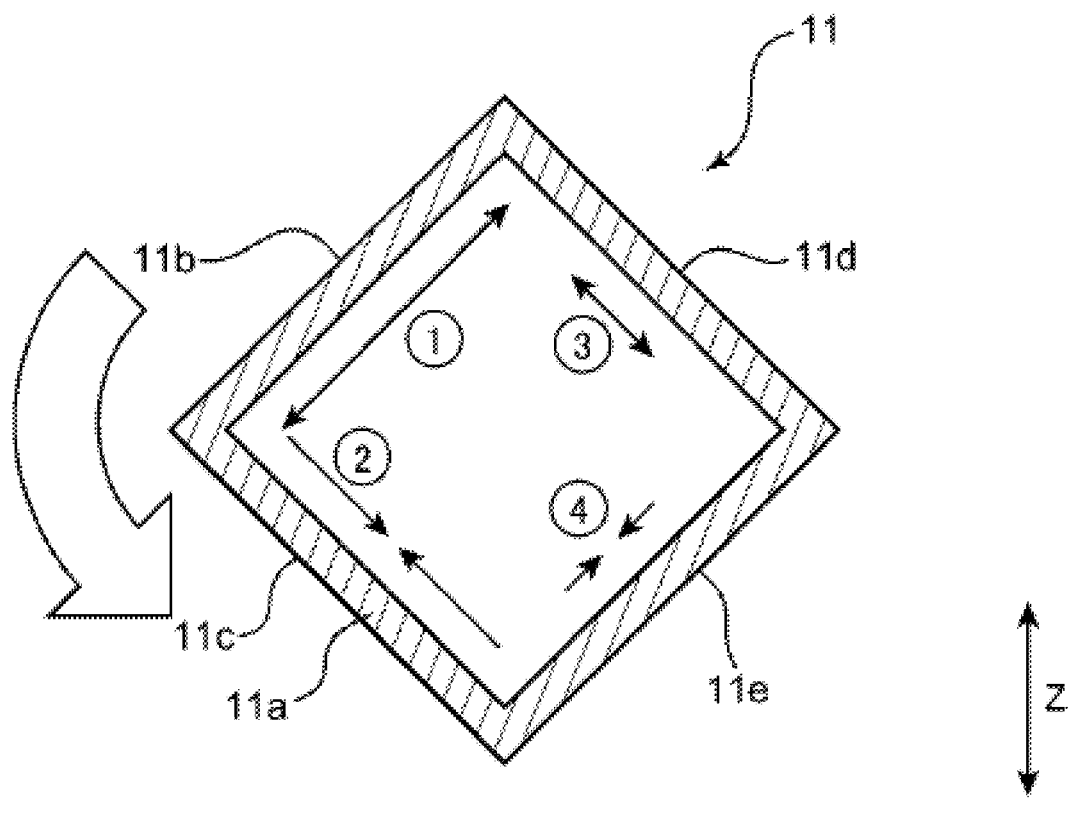
FIG. 9 is a cross-sectional explanatory view schematically illustrating a torsional load applied to each side of the first frame having the rhomboid cross section in FIG. 8 in the case where such a load is applied to the first frame in a counterclockwise direction.

For example, in the case where the torsional load that is applied to the first frame 11 at the time of turning during the travel of the vehicle is assumed and, as illustrated in FIG. 9, the torsional load is applied to the first frame 11 having the rhomboid closed cross section 11a in a downward direction on the outer side Y1 in the vehicle width direction Y, that is, in a counterclockwise direction, the highest tensile stress can be applied to the upper outer side 11b, slightly high compressive stress can be applied to the lower outer side 11c, the low tensile stress can be applied to the upper inner side 11d, and the lowest compressive stress can be applied to the lower inner side 11e.

Figure 10:
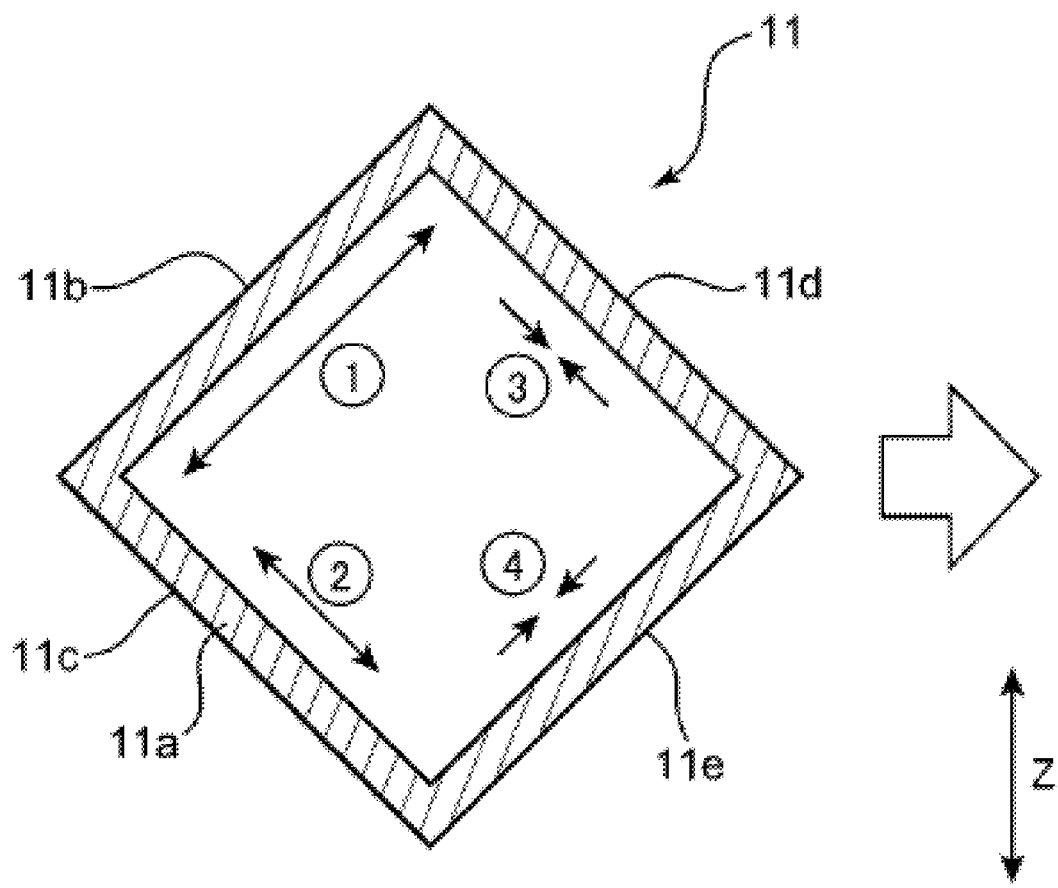
FIG. 10 is a cross-sectional explanatory view schematically illustrating a bending load that is applied to each of the sides of the first frame having the rhomboid cross section in FIG. 8 in the case where such a load is applied to the first frame in a direction toward an inner side in a vehicle width direction of the vehicle.

Next, as illustrated in FIG. 10, in the case where the bending load is applied to the first frame 11 in a direction toward the inner side Y2 in the vehicle width direction Y, the highest tensile stress can be applied to the upper outer side 11b, the slightly high tensile stress can be applied to the lower outer side 11c, the low compressive stress can be applied to the upper inner side 11d, and the lowest compressive stress can be applied to the lower inner side 11e.

It is understood that, in the case where the torsional load and the bending load are applied to the first frame 11 as illustrated in FIGS. 9 to 10 above, both of the high tensile stress and the high compressive stress can be applied to the outer sides 11b, 11c, and in particular, the highest tensile stress can be applied to the first outer side 11b on the upper side.

When this experiment result is considered, the first frame 11 can be reinforced by the second frame 12 by causing the first fixed surface 12b1 and the second fixed surface 12b2 to respectively adhere to the two outer sides 11b, 11c of the first frame 11, and it thus can be possible to exert high rigidity against the torsional load and the bending load.

MODIFIED EXAMPLES (A)

A tip of the first fixed surface 12b1 of the second frame 12 illustrated in FIG. 3 can be located in a region on the left side of the first upper outer side 11b of the first frame 11 (the outer side Y1 in the vehicle width direction Y). However, embodiments of the present disclosure are not limited thereto.

Figure 11:
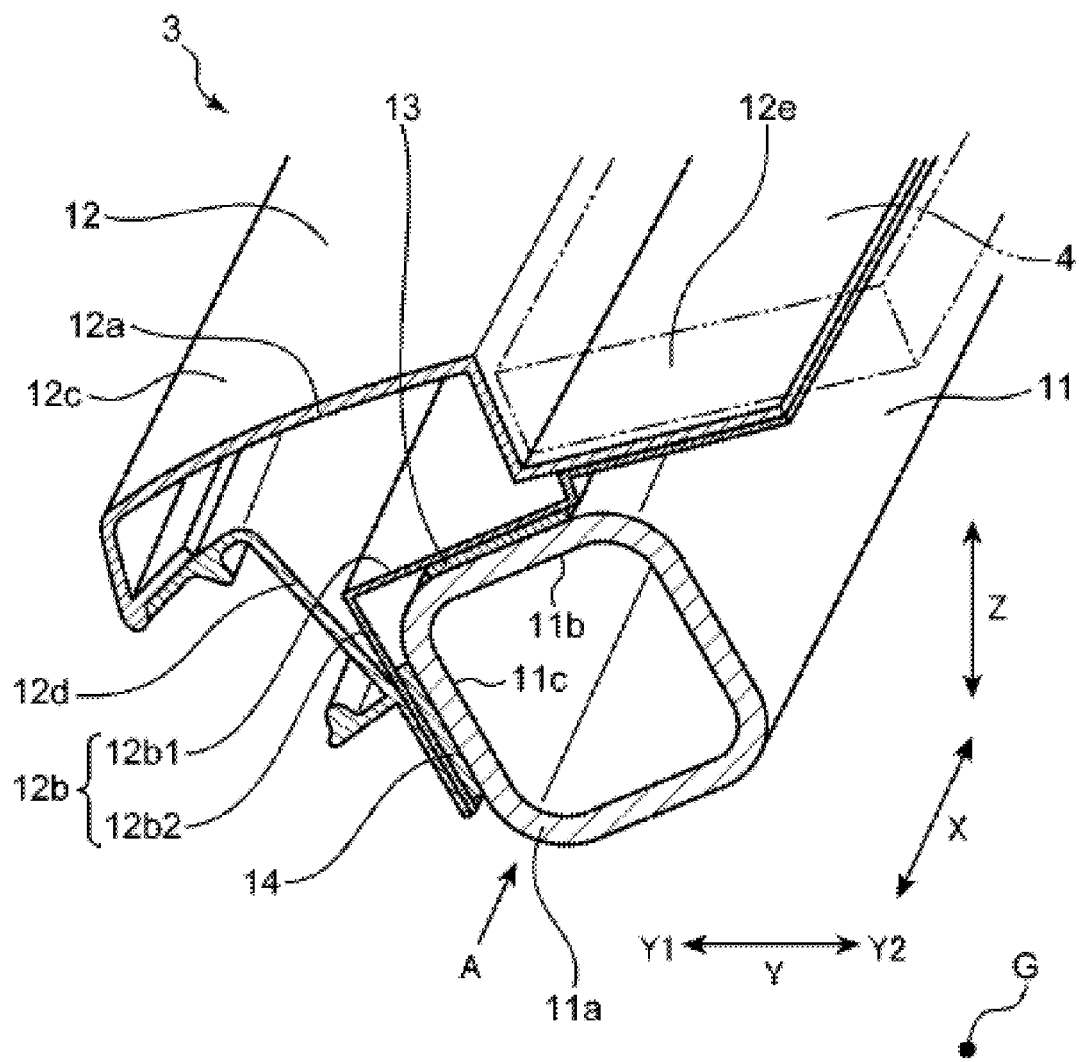
FIG. 11 is a cross-sectional explanatory view illustrating a structure in which a closed cross-sectional portion of the second frame in FIG. 3 according to another modified example of the vehicle body structure of embodiments of the present disclosure extends inward in the vehicle width direction.

As a modified example, as illustrated in FIG. 11, the tip of the first fixed surface 12b1 may be extended to an end portion on the right side (the inner side Y2 in the vehicle width direction Y) of the first outer side 11b, and the closed cross section 12a of the second frame 12 may thereby be expanded to an entire range of the first outer side 11b.

In this configuration of the second frame 12 illustrated in FIG. 11, the closed cross section 12a can be expanded to the entire range of the first outer side 11b. Thus, the effect of the closed cross section 12a to reinforce the flange section 12e can be increased. As a result, it can be possible to reduce a width of the flange section 12e while securing support rigidity for the front windshield 4. In this way, it can be possible to relieve visual obstruction (more specifically, an obstruction angle) of the roof rails 3 on both of the sides in the vehicle width direction Y of the front windshield 4.

(B)

Figure 12:
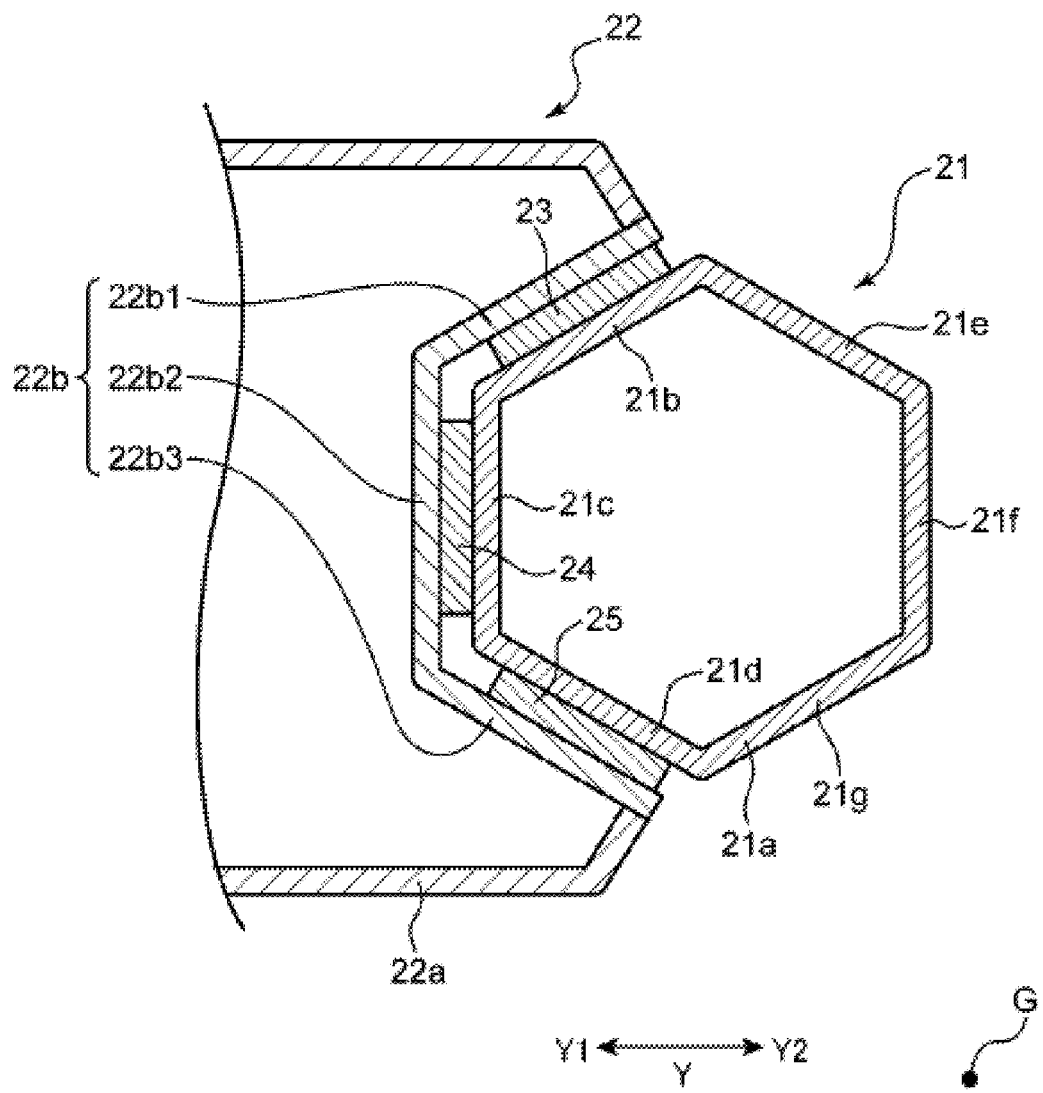
FIG. 12 is a cross-sectional explanatory view illustrating a structure that includes: a first frame in a hexagonal cross section that has three outer sides according to another modified example of the vehicle body structure of embodiments of the present disclosure; and a second frame having three fixed surfaces, each of which is bonded to respective one of the three outer sides.

In embodiments of the present disclosure, as long as the cross-sectional shape of the closed cross section of the first frame is the polygonal shape, the cross-sectional shape thereof may be a hexagonal cross sectional shape as illustrated in FIG. 12, for example. That is, a vehicle body structure in the modified example illustrated in FIG. 12 includes a first frame 21 and a second frame 22.

The first frame 21 can be formed of the first material that is the metal material such as aluminum or steel, and can be in a shape having a hexagonal closed cross section 21a. The closed cross section 21a can have three outer sides 21b, 21c, 21d that can face the outer side Y1 in the vehicle width direction Y.

Meanwhile, the second frame 22 can be formed of the second material, such as the CFRP, that differs from the first material, and can be a member having a closed cross section 22a. The second frame 22 can have the higher tensile strength and can be lighter than the first frame 21. The second frame 22 can have a first frame fixed section 22b that can be fixed to the first frame 21. The first frame fixed section 22b can constitute a part of the closed cross section 22a. The first frame fixed section 22b can have fixed surfaces 22b1, 22b2, 22b3 that can respectively oppose the three outer sides 21b, 21c, 21d of the first frame 21. These three fixed surfaces 22b1, 22b2, 22b3 respectively can be adhered to the three outer sides 21*b*, 21*c*, 21*d*, for instance, by adhesives 23, 24, 25. These adhesives 23, 24, 25 may be separate or connected.

With the configuration in the modified example illustrated in FIG. 12, it can be possible to efficiently transmit the torsional load and/or the bending load, which may be applied to the first frame 21 during the travel of the vehicle 1, from the three outer sides 21*b*, 21*c*, 21*d*, which can face the outer side Y1 in the vehicle width direction Y, in the first frame 21 to the second frame 22 with the high tensile strength via the three fixed surfaces 22*b*1, 22*b*2, 22*b*3, which can respectively be fixed to the outer sides 21*b*, 21*c*, 21*d*, in the second frame 22, that is, by the three transmission paths. As a result, it can be possible to further improve the steering stability of the vehicle 1.

In addition, as noted above, the three fixed surfaces 22*b*1, 22*b*2, 22*b*3 of the second frame 22 separately can be adhered to the three outer sides 21*b*, 21*c*, 21*d* of the first frame 21. In this way, the three different adhesive surfaces can be formed. Accordingly, in the case where the torsional load and/or the bending load is applied to the first frame 21, it can be possible to reliably transmit the load(s) from the first frame 21 to the second frame 22 while at least one of the three adhesive surfaces is applied with the shearing load. As a result, it can be possible to further improve the steering stability of the vehicle 1.

(C)

The shape of the closed cross section of the first frame may only need to have the at least two outer sides that face the different directions, and may be a circular closed cross-sectional shape instead of the polygonal cross-sectional shape. However, in the case of the circular closed cross-sectional shape, a joint surface between the first frame and the second frame is an arc surface, and a direction of an end portion of the arc surface is orthogonal to a joint direction. As a result, it may become difficult to control a film thickness of the adhesive. Accordingly, as in the above embodiment, it is noted that the control of the film thickness of the adhesive may be easier with the polygonal closed cross-sectional shape of the first frame than with the circular closed cross-sectional shape thereof.

(D)

In one or more embodiments of the present disclosure, the second frame, which can have the higher tensile strength and can be lighter than the first frame, may only need to be arranged on the farther side from the center of gravity of the vehicle than the first frame. The second frame may only need to be arranged farther from the center of gravity G than the first frame not only when seen in the cross section in the vehicle width direction Y illustrated in FIGS. 2 to 5 as in the above embodiment, but also when seen in a cross section in another direction.

(E)

In the above embodiment, the description has been made on the example of the roof rail including the first frame and the second frame. However, embodiments of the present disclosure are not limited thereto. Embodiments of the present disclosure can also be applied to another member as long as such a member constitutes the vehicle body. Thus, it can be possible to apply embodiments of the present disclosure not only to the pillar but also to the side sill.

The invention claimed is:

1. A vehicle body structure of a vehicle, the vehicle body structure comprising:
    a first frame that is formed of a first material and has a first closed cross section; and
    a second frame that is formed of a second material, different from the first material, and has a second closed cross section, wherein
    the first frame and the second frame are aligned with each other in a vehicle longitudinal direction,
    the second frame has higher tensile strength and is lighter than the first frame, and
    in a front cross-sectional view of the vehicle, a center associated with the second frame is located on an outer side in a vehicle width direction from a center associated with the first frame with respect to a vehicle center.

2. The vehicle body structure according to claim 1, wherein
    the first frame has a polygonal shape with plural sides in the front cross-sectional view of the vehicle,
    the plural sides have the at least two outer sides with which a surface constituting an outer circumferential surface of the first frame faces an outer side in the vehicle width direction, and
    the second frame includes a fixed surface fixed to the at least two outer sides of the first frame.

3. The vehicle body structure according to claim 2, wherein
    the fixed surface includes at least two fixed surfaces that are respectively adhered to the at least two outer sides of the first frame.

4. The vehicle body structure according to claim 3, wherein
    the first frame has a rhomboid shape, as the polygonal shape, with four sides including the at least two outer sides of the first frame in the front cross-sectional view of the vehicle, and
    the second frame includes the at least two fixed surfaces that are respectively fixed to the at least two outer sides of the first frame.

5. The vehicle body structure according to claim 4, wherein
    the first frame is arranged such that, of plural diagonal lines in a cross section of the polygonal shape, a longest diagonal line of the plural diagonal lines faces a vehicle vertical direction.

6. The vehicle body structure according to claim 2, wherein
    the first frame has a rhomboid shape, as the polygonal shape, with four sides including the at least two outer sides of the first frame in the front cross-sectional view of the vehicle, and
    the second frame includes at least two fixed surfaces, as part of the fixed surface, that are respectively fixed to the at least two outer sides of the first frame.

7. The vehicle body structure according to claim 5, wherein
    the first frame is arranged such that, of plural diagonal lines in a cross section of the polygonal shape, a longest diagonal line of the plural diagonal lines faces a vehicle vertical direction.

8. The vehicle body structure according to claim 5, wherein
    the first frame is arranged such that, of plural diagonal lines in a cross section of the polygonal shape, a longest diagonal line of the plural diagonal lines faces a vehicle vertical direction.

9. The vehicle body structure according to claim 5, wherein the first frame is arranged such that, of plural diagonal lines in a cross section of the polygonal shape, a longest diagonal line of the plural diagonal lines faces a vehicle vertical direction.

10. The vehicle body structure according to claim 1, further comprising:
a pair of roof rails constituting an upper portion of a vehicle body, wherein
each of the roof rails of the pair of roof rails is constructed from at least the first frame and the second frame.

11. The vehicle body structure according to claim 10, wherein
the first material of the first frame is metal, and
the second material of the second frame is a reinforced fiber resin that is reinforced by carbon fiber.

12. The vehicle body structure according to claim 1, wherein
the first frame extends in the vehicle longitudinal direction of the vehicle,
the first frame has a polygonal shape with plural sides in the front cross-sectional view of the vehicle,
the polygonal shape is a rhomboid in the front cross-sectional view of the vehicle, and
the plural sides of the first frame form the rhomboid and the first closed cross section in the front cross-sectional view of the vehicle.

13. The vehicle body structure according to claim 12, wherein
the plural sides have the at least two outer sides with which a surface constituting an outer circumferential surface of the first frame faces an outer side in the vehicle width direction,
a first outer side of the at least two outer sides faces the outer side in the vehicle width direction and obliquely upward, and
a second outer side of the at least two outer sides faces the outer side in the vehicle width direction and obliquely downward.

14. The vehicle body structure according to claim 1, wherein
the second frame extends in the vehicle longitudinal direction of the vehicle,
the second frame includes a first frame fixed section, an outer surface constituting section, and a weather strip attachment section, and
the first frame fixed section, the outer surface constituting section, and the weather strip attachment section form the second closed cross section of the second frame.

15. The vehicle body structure according to claim 14, wherein
the first frame fixed section includes a first fixed surface and a second fixed surface as two fixed surfaces of the first frame fixed to respective outer sides of the first frame, and
the first fixed surface and the second fixed surface are orthogonal to each other.

16. The vehicle body structure according to claim 12,
the second frame extends in the vehicle longitudinal direction of the vehicle,
the second frame includes a first frame fixed section, an outer surface constituting section, and a weather strip attachment section, and
the first frame fixed section, the outer surface constituting section, and the weather strip attachment section form the second closed cross section of the second frame.

17. The vehicle body structure according to claim 1, wherein
the first frame has a polygonal shape with plural sides in the front cross-sectional view of the vehicle,
the plural sides have the at least two outer sides with which a surface constituting an outer circumferential surface of the first frame faces an outer side in the vehicle width direction, and
of the plural sides, only the at least two outer sides of the first frame are adhered to the second frame.

\* \* \* \* \*